D. B. MITCHELL.
DOG COLLAR.
APPLICATION FILED JUNE 22, 1921.
1,408,123.
Patented Feb. 28, 1922.
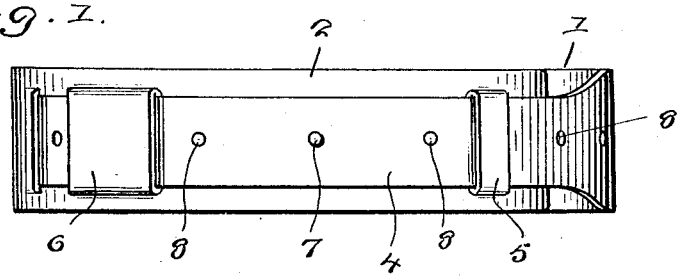
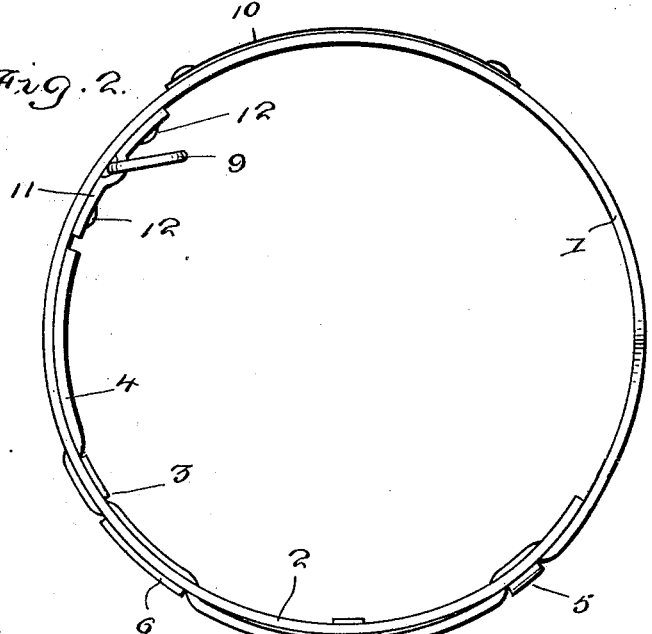
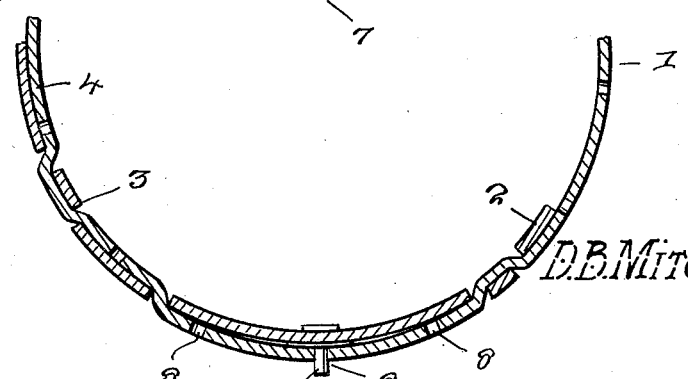
D. B. Mitchell, Inventor.

UNITED STATES PATENT OFFICE.

DANIEL B. MITCHELL, OF CARLISLE, KENTUCKY.

DOG COLLAR.

1,408,123. Specification of Letters Patent. Patented Feb. 28, 1922.

Application filed June 22, 1921. Serial No. 479,441.

*To all whom it may concern:*

Be it known that I, DANIEL B. MITCHELL, a citizen of the United States, residing at Carlisle, in the county of Nicholas and State of Kentucky, have invented new and useful Improvements in Dog Collars, of which the following is a specification.

The object of my present invention is the provision of an adjustable dog collar that is free of exterior projections, and is therefore, not likely to get caught in a fence or the like.

To the attainment of the foregoing, the invention consists in the improvement as hereinafter described and definitely claimed.

In the accompanying drawings, forming part of this specification:—

Figure 1 is a side elevation of my novel collar showing the same as closed.

Figure 2 is an edge elevation or plan of the closed collar.

Figure 3 is a longitudinal section illustrating the manner in which the end portions of the collar strap are adjustably connected together.

Similar numerals of reference designate corresponding parts in all of the views of the drawings.

The major portion of my novel collar is formed by a strap 1 of leather or other appropriate material. One end portion of the strap 1 is, by preference, comparatively wide as indicated by 2, and in the said wide portion 2 are formed openings 3 for the reception and passage of the other end portion of the strap which is designated by 4. It will also be noticed that the end portion 4 is by preference comparatively narrow, Figure 1, and it is arranged within loops 5 and 6 formed on the said end portion 2 by the formation of the before mentioned openings 3. By virtue of this construction the lapped end portions of the collar strap 1 are adapted to lie close together so as not to form a considerable projection on the neck of the animal. The end portion 2 is provided at 7 with outwardly extending stud, and the end portion 4 is provided with apertures 8 one of which is adapted to receive the said stud 7. It will also be observed that the end portion 4 is arranged close to a loop 9 arranged at the inner side of the strap 1 and connected thereto for the attachment to the collar of a leash (not shown). The loop 9 is preferably of metal, and when in use is swung snugly against the inner side of the collar strap 1. On the exterior of the collar strap 1 is arranged and suitably secured a name plate 10 of brass or other appropriate material. It will be apparent from the foregoing that while exceedingly simple in construction and susceptible of being adjusted as to size, my novel collar is free of projections such as buckles that are likely to catch into a fence and hold a dog fast. On the other hand my novel collar is adjustably fixed as to size through the medium of the stud 7 which is of such character that there is no liability whatever of its catching into anything. The loop 9 is hingedly connected to the inner side of the strap 1 through the medium of a similar leather section 11, riveted at 12 to the inner side of the strap 1 and hingedly receiving one bar of the loop 9.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A dog collar comprising a strap having end portions one of which is provided with apertures at intervals for the passage of the other, and one of which is provided on one end portion with a stud to enter an aperture in the other; the apertured end portion being comparatively wide and adapted to rest at the inner side of the other end portion, and being further provided with loops to straddle such other end portion, in combination with a loop attached to the inner side of the strap and adapted for the connection of a leash.

In testimony whereof, I affix my signature.

DANIEL B. MITCHELL.